March 27, 1962 W. LÖDIGE ET AL 3,027,102
APPARATUS FOR MIXING AND COMMINUTING
Filed Dec. 16, 1958
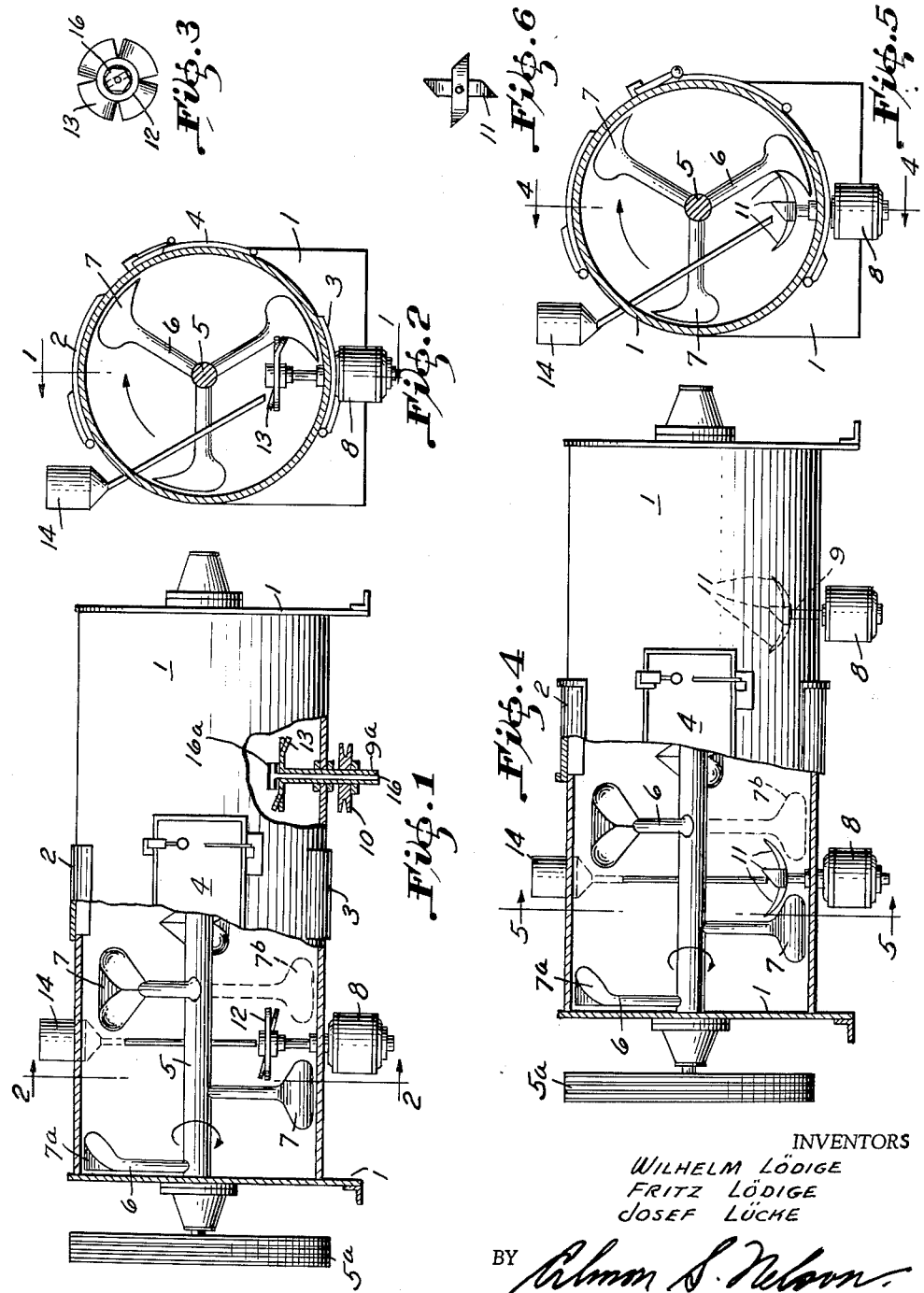
INVENTORS
WILHELM LÖDIGE
FRITZ LÖDIGE
JOSEF LÜCKE
BY
ATTORNEY United States Patent Office 3,027,102
Patented Mar. 27, 1962

3,027,102
APPARATUS FOR MIXING AND COMMINUTING
Wilhelm Lödige, 9C Elsener Strasse, Fritz Lödige, 9B Elsener Strasse, and Josef Lücke, 13 Im Lohfeld, all of Paderborn, Germany
Filed Dec. 16, 1958, Ser. No. 780,769
Claims priority, application Germany Dec. 20, 1957
8 Claims. (Cl. 241—98)

The present invention relates to an apparatus for mixing and comminuting materials.

The invention is particularly concerned with a mixing and comminuting apparatus which operates on the principle of a positive-action mixer and in which at least one rapidly rotating "chopper" is provided.

Most mixing apparatus operates in accordance with the principle of the positive-action mixer in which the mixing tools consist of straight or inclined paddles, worm-type agitating devices, or unilaterally or bilaterally acting mixing elements similar in shape to ploughshares. Depending on the mixing problem and the kind of mixing elements in the mixer, the mixing tools are driven either slowly e.g. at a speed of 1.5 to 2.5 metres per second, or rapidly e.g. 6 to 12 metres per second, in the case of a machine with a mixing chamber or drum of 100 cm. diameter. In these mixers the speed of rotation is kept sufficiently low that the material to be mixed does not form as a ring on the drum wall. With slow-running positive-action mixers, the mixing operation is generally carried out by the displacement of material in the mass of material to be mixed, whereas in high-speed mixing machines only about 60 to 70% of the useful volume of the mixing drum is used in many cases, and portions of the material being mixed are continually lifted out of the masses of material lying at the bottom and are hurled into an empty space in the drum above the rotor shaft. Mixers are often used which consist of hoppers with conical bottoms in which worms are arranged vertically or travel along the walls of the cones, these worms lifting the material upwards and then allowing it to fall downwards.

A further type of mixing machine, which has come into practical use, particularly in domestic and kitchen appliances, uses conical hoppers at the lowest point of which there is arranged a rapidly rotating cross-shaped cutter member whereby parts of the material to be mixed are continually engaged, beaten or cut to pieces and then forced laterally upwards by reason of the way in which the cutters are positioned. In the middle of the hopper, the material continually falls back on to the rotating cross-shaped cutter, so that the material in the hopper is not only beaten or chopped to pieces by the cutter but is also kept continually in motion. However, an apparatus of this kind can only be used with products capable of trickling up to sizes of about 200–250 litres capacity since the circulation of the material is not carried out with sufficient uniformity in larger sizes, or else the material, if the material to be mixed is not capable of trickling easily, does not flow back at all owing to bridge formations, and consequently the material is no longer processed by the rapidly rotating cross-shaped cutter.

The present invention is based on the discovery that novel and surprising mixing effects can be obtained by combining the principles of the positive-action mixer with the principle of rapidly rotating cross-shaped cutters, which are referred to herein as "choppers," and by so constructing the mixing apparatus that functional cooperation takes place between the mixing tools of the positive-action mixer and the chopper or choppers arranged in the mixing apparatus. For this purpose, it is particularly necessary that the rapidly rotating cross-shaped cutters are located in workable proximity with regard to the mixing tools, i.e. that on the one hand, the mixing tools of the positive-action mixer be so arranged and shaped that they continually return the material being mixed to the chopper or choppers arranged in the apparatus and that, on the other hand, the choppers are so arranged that they do not contact the mixing tools, do not disturb the work of the mixing tools, and continually throw or urge the material which they have chopped up back to the mixing tools.

The mixing containers for the apparatus according to the invention can be, for example, trough-shaped or cylindrical in form, or may have the form of a vertically arranged cone. Having regard to the work carried out by the mixing tools, it is generally appropriate to use horizontally mounted cylindrical or trough-shaped containers. The mixing tools are driven by a motor-driven shaft which extends through the mixing chamber. The shaft expediently extends parallel to the container wall through the middle of the cylindrical mixing chamber or lower part of the trough. One or more shafts can be provided. The mixing tools are arranged in a manner known per se by means of supporting arms on the shaft, and are preferably perpendicular to the shaft, and are distributed in a helical formation about the shaft. That part of the mixing chamber which is required for the undisturbed working of the chopper, must be left free of mixing tools. The mixing elements can be any elements which are capable of mixing the material and passing it to the choppers. If slow-running mixing tools are used, a good effect is obtained, for example, with paddles which are positioned obliquely and thereby displace the material to be mixed towards the choppers. Alternatively, it is also possible to use worm-like mixing tools. With high-speed mixing tools it is expedient to use a ploughshare-like form which can be embodied as a unilaterally or bilaterally acting element. However it is advantageous to arrange at the head ends of the mixing drum ploughshare-like tools which have a unilateral action, so as to throw material towards the interior of the drum. The ploughshare-like mixing elements lift the material away from the drum wall, and, even with relatively high peripheral speeds, do not form any compacted rings of material, require very little force to pass through the material to be mixed, and consequently require very little energy despite their high speed of rotation. The operation of such machines is very economical in relation to the mixing effect obtained.

The choppers are advantageously arranged below the mixer shaft in the mixing container since under these circumstances it is easiest to feed the material continuously to the chopper. The mixing container is in this case generally stationary. The choppers expediently each consist of two propellers formed as cutters and arranged in a crosswise formation. As in the case of known devices of this kind, the speed of rotation is about 3000 r.p.m. with a diameter of e.g. 200 mm. The choppers are driven by one or more motors which can be arranged on the outer wall of the mixing container. In one form of the invention, a stub shaft of the motor is guided by means of an appropriate packing through a drum wall, and a chopper is arranged on the stub shaft at a distance of about 10–100 mm. from the inner side of the drum wall. It is also possible to arrange the chopper on a separate shaft which is driven by a motor by means of a V-belt through the agency of a V-belt pulley arranged on the shaft externally of the drum. Mixers according to the invention can be made to any desired size, e.g. with contents of 30,000 litres, with the same mixing and grinding effects, even for materials which do not trickle very easily or do not trickle at all, since any desired number of choppers can be arranged in the apparatus and mixing elements can be chosen which operate with the lowest possible application of force and feed new material at a very high speed to the choppers and receive material therefrom.

It is possible with the apparatus of the present invention to solve mixing problems which could not hitherto be solved in positive-action mixers, nor in machines operating with rapidly rotating cross-shaped cutters. In many branches of industry it is necessary to produce relatively large quantities of a mixture with the greatest possible consistency with regard to grain size and degree of mixing. However, this is not possible if the total quantity has to be produced in a plurality of batches. The individual batches always exhibit a few differences as regards homogeneity since the components of the mixture may be variable as regards e.g. grain size and degree of purity, and the mixing operation also cannot be reproduced with close accuracy. Particularly in the dye industry, exacting conditions of this kind as regards the uniformity of dyes consisting of mixtures of individual dyestuff components with one another or with waste substances, have to be met if a mark-free product is to be obtained.

Problems of this kind can be solved in the apparatus according to the invention, with surprisingly short mixing times and in an economically satisfactory manner. Whereas for many of these problems ball mills and mixing times of up to say 6 hours have been used hitherto, with the apparatus according to the invention the same effects can be obtained with a mixing time of say about half an hour.

Furthermore, the machines according to the present invention are very well suited to mixing fibrous constituents such as asbestos, paper stuff, linters, etc. with substances in powder form. Hitherto, with problems of this kind, pulping or perfecting engines had often to be employed first of all and then mixing with the pulverulent substance was carried out subsequently in a positive-action mixer. However, this method does not make it possible to achieve any homogeneity in the product, since tufts and knots form in the mixer which cannot be broken down again by the mixing tools of the positive-action mixer. But the provision of choppers in the positive-action mixer according to the invention provides a homogenous product, since any tufts and knots which form are rapidly destroyed by the choppers. In addition, it is not necessary to pass the material through a pulping engine first of all. The particular advantage is therefore achieved that a homogeneous mixed product can be produced in a single working operation from fibres and pulverized substances.

A special mixing problem, namely the mixing of small quantities of a liquid with a product capable of trickling, with formation of a granulate or in such manner as to retain trickling ability, is solved in a surprisingly simple manner with a special form of the apparatus according to the invention. In the case of this problem, the high-speed choppers can be so constructed that they not only chop up the material to be mixed which is supplied to them, but also act as atomizers for the liquid introduced into the apparatus. Whereas, as mentioned hereinbefore, the choppers generally consist of propeller cutters in a crosswise arrangement, in cases where liquids are added it is expedient for them to be in the form of a disc of about 150 mm. in diameter which rotates rapidly say at a speed of about 3,000 r.p.m. or higher, and at whose periphery there are arranged cutters which are suitable for cutting up the material and are positioned obliquely at distances of e.g. 10–90°. The spacing of the cutters depends on the type of material to be mixed and the viscosity of the liquid introduced. If the liquid is delivered on to the disc near the center point thereof, the liquid is atomized in a very fine manner in all directions due to the high centrifugal force which is provided by the high speed of rotation of the disc. It is therefore deposited in a very finely divided form on the solid constituents of the mixture which are pulverized or unravelled by the obliquely positioned cutters. If small agglomerations form in this operation, these are immediately destroyed by the cutters arranged at the periphery of the disc. The liquid can be admitted through a pipe, in which case the pipe must end near the middle point of the disc and the liquid must drop on to the disc near the middle point thereof in order to achieve uniform atomization. According to a further form of the invention the chopper disc is arranged on a hollow shaft through whose bore the liquid can be guided into the middle of the disc. The disc can be mounted a few millimetres from the end of the shaft, the end of the shaft can be closed and the liquid can be made to issue laterally through small holes from the shaft and on to the disc.

In order that the invention may be readily carried into effect, it will now be described with reference to the accompanying drawings wherein:

FIGURE 1 is a partly cut away side view of an embodiment of the apparatus of the invention;

FIGURE 2 is a section on line 2—2 of FIGURE 1;

FIGURE 3 is a detail view of the chopper component of FIG. 1;

FIGURE 4 is a partly cut away side view section of a modification of the apparatus of FIG. 1;

FIGURE 5 is a section on line 5—5 of FIGURE 4; and

FIGURE 6 is a detail view of the chopper component of FIG. 4.

In the drawings, a mixing drum or container is designated as 1. As shown in the figures the container 1 is preferably of substantially cylindrical configuration having spaced substantially parallel bases and a substantially cylindrical inside wall joining said bases. Situated at the top of the mixing drum 1 is a filling aperture which is closed by a cover 2, adapted to the curvature of the drum 1 in order to avoid any dead spaces. Arranged at the lowest part of the drum 1 is a central emptying aperture which is closed by a cover 3 adapted to the curvature of the drum. A cleaning door 4 is arranged laterally on the mixing drum for assembly and cleaning purposes. A shaft 5 extends axially of the drum 1 which is driven by means of a V-belt pulley 5a and carries radially extending supporting arms 6 spaced from each other in the longitudinal direction and provided with mixing elements 7 all of which extend substantially adjacent or close to the inside wall of the drum. Various kinds of mixing elements can be used, those illustrated in the drawings being shaped similarly to ploughshares. Electric motors drive choppers or comminuters 11 or 13 on the ends of stub shafts 9 which extend, with appropriate packing, through the cylindrical wall of the drum. The choppers 11 or 13 are arranged between the working region of the mixing elements on the supporting arms. For illustrative purposes 7b indicates the lowest position of a mixing tool neighbouring the left hand choppers 11 or 13 in FIGURES 1 and 4.

In the embodiment of FIGURE 1, a V-belt pulley 10 is mounted on a chopper shaft 9a outside the drum so that the shaft can be driven by means of a V-belt from a motor. This is particularly expedient if the chopper shaft is hollow and liquid is to be guided to the chopper in the direction of the arrow 16 through this shaft. For liquid admission, the chopper must be constructed as illustrated in FIGURE 3, in contrast to the simple cross-shaped cutter chopper 11 shown in FIGURE 6. The liquid flows through appropriate holes on to a central part 12 of the chopper which is constructed as a centrifuging disc. Arranged on the periphery of the centrifuging disc 12 are the chopper cutters 13.

If this chopper is rotated at a high speed, for instance 3,000 r.p.m. and above, the liquid, due to centrifugal force, flows from the part 12 of the chopper on to the cutters 13 arranged on the periphery of the centrifuging disc and in so doing mixes in finely divided form with the dry material to be mixed. If, in so doing, small agglomerations form, these are again chopped up by the cutters 13. The liquid can also be allowed to fall freely from a vessel 14 arranged above the mixing drum through a pipe 15 on to the centrifuging disc 12 of the chopper. However, with this arrangement the liquid, as already mentioned, must be brought into the vicinity of the axis of the centrifuging disc since otherwise it would not be taken up due to the centrifuging action.

What we claim is:

1. Apparatus for mixing and comminuting pulverulent, fine-grained or fibrous materials comprising, in combination, a substantially horizontally positioned container, mixing means extending with their outer edges close to the inside wall of said container and being arranged so as to be rotatable in a vertical plane, rapidly rotating cross-shaped cutter means located in the lower half of said container, and in workable proximity with regard to said mixing means, a supply arrangement for supplying material to be mixed and comminuted into said container and a discharge arrangement for discharging the mixed and comminuted material from said container.

2. Apparatus according to claim 1 wherein the mixing means extending with the outer edges close to the inside wall of the container of the apparatus are arranged on the ends of radially extending arms on a rotatable shaft extending coaxially through said container and the rapidly rotating cross-shaped cutter means are located in a region of said container below said shaft.

3. Apparatus according to claim 2 wherein the rapidly rotating cross-shaped cutter means are arranged on a shaft extending through the wall of the container of the apparatus and which is provided with separate driving means for driving the shaft extending coaxially through said container and for driving said cross-shaped cutter means.

4. Apparatus according to claim 3 wherein the mixing means are shaped in ploughshare-like form and the rapidly rotating cross-shaped cutter means are located in a region of the container of the apparatus below the rotatable shaft extending coaxially through said container and between said ploughshare-like mixing means.

5. Apparatus according to claim 3 wherein the rapidly rotating cross-shaped cutter means consist of two cross-wise arranged propellers formed as cutters and are arranged on a shaft extending through the wall of the container of the apparatus and which is provided with separate driving means for driving the shaft extending coaxially through said container and for driving said cross-wise arranged propellers.

6. Apparatus according to claim 5 which is provided with a supply arrangement for supplying liquid to the centre of said cross-wise arranged propellers.

7. Apparatus according to claim 3 wherein the rapidly rotating cross-shaped cutter means consist of a rapidly rotating disk having obliquely positioned cutters on the periphery thereof and are arranged on a shaft extending through the wall of the container of the apparatus and which is provided with separate driving means for driving the shaft extending coaxially through said container and for driving said rapidly rotating disk.

8. Apparatus according to claim 7 which is provided with a supply arrangement for supplying liquid to the region of the centre of said rapidly rotating disk.

References Cited in the file of this patent

UNITED STATES PATENTS

| | | |
|---|---|---|
| 277,319 | Miller | May 8, 1883 |
| 323,875 | Lyon | Aug. 4, 1885 |
| 389,760 | Norton | Sept. 18, 1888 |
| 1,222,218 | Kutter | Apr. 10, 1917 |
| 1,431,422 | Randecker | Oct. 10, 1922 |
| 1,692,617 | Bowen | Nov. 20, 1928 |
| 1,706,417 | Simpson | Mar. 26, 1929 |
| 1,735,393 | Hiller | Nov. 12, 1929 |
| 2,147,184 | Aasted | Feb. 14, 1939 |
| 2,278,051 | Ambrose | Mar. 31, 1942 |
| 2,281,329 | Simpson | Apr. 28, 1942 |
| 2,552,360 | Zichis | May 8, 1951 |
| 2,575,410 | David | Nov. 20, 1951 |
| 2,595,509 | Brown | May 6, 1952 |
| 2,769,623 | Cawood | Nov. 6, 1956 |
| 2,825,511 | Byberg | Mar. 4, 1958 |

FOREIGN PATENTS

| | | |
|---|---|---|
| 82,104 | Sweden | Sept. 17, 1934 |
| 983,246 | France | Feb. 7, 1951 |